(12) United States Patent
Muth (10) Patent No.: US 9,471,528 B2
(45) Date of Patent: Oct. 18, 2016

(54) CONTROLLER AREA NETWORK (CAN) TRANSCEIVER AND METHOD FOR OPERATING A CAN TRANSCEIVER

(71) Applicant: NXP B.V., Eindhoven (NL)

(72) Inventor: Matthias Muth, Stelle (DE)

(73) Assignee: NXP B.V., Eindhoven (NL)

( * ) Notice: Subject to any disclaimer, the term of this patent is extended or adjusted under 35 U.S.C. 154(b) by 376 days.

(21) Appl. No.: 14/044,432

(22) Filed: Oct. 2, 2013

(65) Prior Publication Data

US 2014/0129748 A1    May 8, 2014

Related U.S. Application Data

(60) Provisional application No. 61/721,717, filed on Nov. 2, 2012.

(51) Int. Cl.
| | | |
|---|---|---|
| *G06F 3/00* | (2006.01) | |
| *G06F 13/42* | (2006.01) | |
| *G06F 13/40* | (2006.01) | |
| *H04L 12/413* | (2006.01) | |
| *H04L 12/40* | (2006.01) | |

(52) U.S. Cl.
CPC .............. *G06F 13/4072* (2013.01); *G06F 3/00* (2013.01); *G06F 13/42* (2013.01); *H04L 12/4135* (2013.01); *H04L 2012/40215* (2013.01)

(58) Field of Classification Search
USPC ...... 710/11, 105, 106, 305; 714/39; 370/470
See application file for complete search history.

(56) References Cited

U.S. PATENT DOCUMENTS

| 6,941,113 B2* | 9/2005 | Asano ............................. 455/73 |
| 2004/0153870 A1* | 8/2004 | Konz et al. ...................... 714/47 |
| 2013/0290580 A1* | 10/2013 | Hartwich et al. ............. 710/105 |
| 2013/0294460 A1* | 11/2013 | Hell .............................. 370/470 |
| 2014/0071995 A1* | 3/2014 | Hartwich ....................... 370/468 |
| 2014/0156893 A1* | 6/2014 | Monroe et al. ................ 710/117 |
| 2014/0223258 A1* | 8/2014 | Hartwich et al. ............. 714/758 |

OTHER PUBLICATIONS

Solutions of CAN and CAN FD in a mixed network topology, Monroe et al., Texas Instruments, 2013.*
Bosch, "CAN with Flexible Data-Rate" Specification v1.0; Apr. 17, 2012.
Bosch, CAN with Flexible Data-Rate; White Paper v1.1; 2011.
CAN Newsletter Online; "First-hand information on CAN FD"; 3 pgs; Oct. 2012.
Microchip; "High-Speed Transceiver"; MCP2551; pp. 1-22; 2003.
NXP HS-CAN transceiver TJA1145 & SBC UJA1168 for partial networking; 2 pgs.; Aug. 2011.

(Continued)

*Primary Examiner* — Khanh Dang (57) ABSTRACT

Embodiments of a system and method are disclosed. One embodiment is a Controller Area Network (CAN) transceiver. The CAN transceiver includes a CAN bus interface, a TXD interface, an RXD interface, a transmitter connected between the TXD interface and the CAN bus interface, a receiver connected between the RXD interface and the CAN bus interface, a traffic control system connected between the CAN bus interface, the TXD interface, and the RXD interface. The traffic control system detects the presence of CAN Flexible Data-rate (FD) traffic on the CAN bus interface and if the traffic control system detects the presence of CAN FD traffic on the CAN bus interface, the traffic controls system changes an operating state of the transceiver.

14 Claims, 10 Drawing Sheets

(56) References Cited

OTHER PUBLICATIONS

Texas Instruments; Introduction to the Controller Area Network (CAN); Application Report; SLOA101A; pp. 1-15; Aug. 2002-Revised Jul. 2008.

On Semiconductor; "High Speed CAN Transceiver"; AMS-30660; Rev. 10; pp. 1-10; Aug. 2012.

ATMEL; "High-Speed CAN Transceiver"; ATA6660; pp. 1-13; Feb. 2008.

* cited by examiner

CONTROLLER AREA NETWORK (CAN) TRANSCEIVER AND METHOD FOR OPERATING A CAN TRANSCEIVER

This application claims priority from U.S. Provisional Application Ser. No. 61/721,717, filed Nov. 2, 2012, entitled "CAN FD Silent Transceiver," which is incorporated by reference herein.

Controller area network (CAN) bus is a message-based communications bus protocol that is often used within automobiles. The CAN bus protocol is used to enable communications between various electronic control units (ECUs), such as an engine control module (ECM), a power train control module (PCM), airbags, antilock brakes, cruise control, electric power steering, audio systems, windows, doors, mirror adjustment, battery and recharging systems for hybrid/electric cars, and many more. The data link layer of the CAN protocol is standardized as International Standards Organization (ISO) 11898-1. The standardized CAN data link layer protocol is in the process of being extended to provide higher data rates. The extended protocol, referred to as CAN Flexible Data-Rate or "CAN FD," is moving towards standardization in the form of an update of the existing ISO 11898-1 standard. The emerging working draft (WD) of the ISO 11898-1 standard is described in the document, *CAN with Flexible Data-Rate*, Specification Version 1.0, released Apr. 17, 2012, and is being referred to as ISO 11898-1 WD.

In order to implement CAN FD in systems such as vehicles, all nodes in the network should be compatible with CAN FD. However, with a complex system with multiple ECUs such as an automobile, it is difficult to atomically switch all ECUs to be CAN FD compliant. Various techniques have been proposed and/or implemented to support the transition to CAN FD.

One technique involves CAN FD "passive" partial networking transceivers. Passive partial networking transceivers puts a node into a sleep mode and with that "hide" the CAN FD traffic from the old CAN engines in the microcontrollers. This technique is used for "FLASH-ing" an automobile using CAN FD with only a few new CAN FD nodes, but it cannot use CAN FD with old nodes during normal communication. This technique enables easy implementation and early availability. However, the technique does not support CAN FD communication during run time of the automobile and it is an island solution for software FLASH-ing during professional servicing or end of line programming.

Another technique involves using a CAN FD "active" stand-alone controller that is suitable for connection to any microcontroller. This technique involves an SPI to CAN FD bridge and allows each ECU to be upgraded with CAN FD by changing the PHY. Although this technique allows CAN FD to be run throughout an automobile, it requires hardware and software upgrades in each ECU.

Another technique involves upgrading microcontrollers with a new CAN FD block. In particular, old CAN engines would be modified to be CAN FD "silent". For this technique, the CAN IP does not need to send or receive the new CAN frame format, but "ignores" the new CAN frame format without forcing bus errors. This technique would require all microcontrollers to be upgraded, but has only a small impact on the integrated CAN IP. Although all microcontrollers must undergo a hardware and software upgrade, the network is still not able to implement network wide CAN FD.

Another technique involves developing an alternative standard. For example, there is a proposed alternative standard, referred to as CAN FD Compatible or "CAN FDC," which involves using two different bus level schemes on the bus, the conventional one for the standard CAN traffic plus an inverse level scheme for the new fast bus traffic. The inverse level scheme is simply applied by a second CAN transceiver using the opposite polarity, which is invisible for the normally connected CAN transceivers. According to this alternative standard, there might be hidden fast traffic in the background while the normal CAN nodes just see a dummy frame according to the known CAN rules. The second transceiver is connected to a new CAN engine running at a higher speed. Although this technique is backward compatible since the old CAN nodes do not recognize the fast traffic, all nodes supporting CAN FDC need new CAN protocol engines plus a second CAN transceiver.

Although various techniques have been proposed and/or implemented to support the transition to CAN FD, there is still a need for a backwards compatible solution that allows the use of CAN FD during automobile run time.

Embodiments of a system and method are disclosed. One embodiment is a Controller Area Network (CAN) transceiver. The CAN transceiver includes a CAN bus interface, a TXD interface, an RXD interface, a transmitter connected between the TXD interface and the CAN bus interface, a receiver connected between the RXD interface and the CAN bus interface, a traffic control system connected between the CAN bus interface, the TXD interface, and the RXD interface. The traffic control system detects the presence of CAN Flexible Data-rate (FD) traffic on the CAN bus interface and if the traffic control system detects the presence of CAN FD traffic on the CAN bus interface, the traffic controls system changes an operating state of the transceiver.

A method for operating a CAN transceiver is disclosed. The method involves decoding traffic received on a CAN bus interface of the CAN transceiver, monitoring the decoded traffic for the presence of CAN FD traffic, and if the presence of CAN FD traffic is detected on the CAN bus interface, then changing an operating state of the CAN transceiver.

Another embodiment of a CAN transceiver is disclosed. The CAN transceiver includes a CAN bus interface, a TXD interface connected to the CAN bus interface, an RXD interface connected to the CAN bus interface, a transmitter connected between the TXD interface and the CAN bus interface, a receiver connected between the RXD interface and the CAN bus interface, a CAN protocol controller configured to decode traffic received on the CAN bus interface and if the CAN protocol controller detects the presence of CAN Flexible Data-rate (FD) traffic on the CAN bus interface, to output a control signal to change an operating state of the CAN transceiver.

Other aspects in accordance with the invention will become apparent from the following detailed description, taken in conjunction with the accompanying drawings, illustrated by way of example of the principles of the invention.

Throughout the description, similar reference numbers may be used to identify similar elements.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
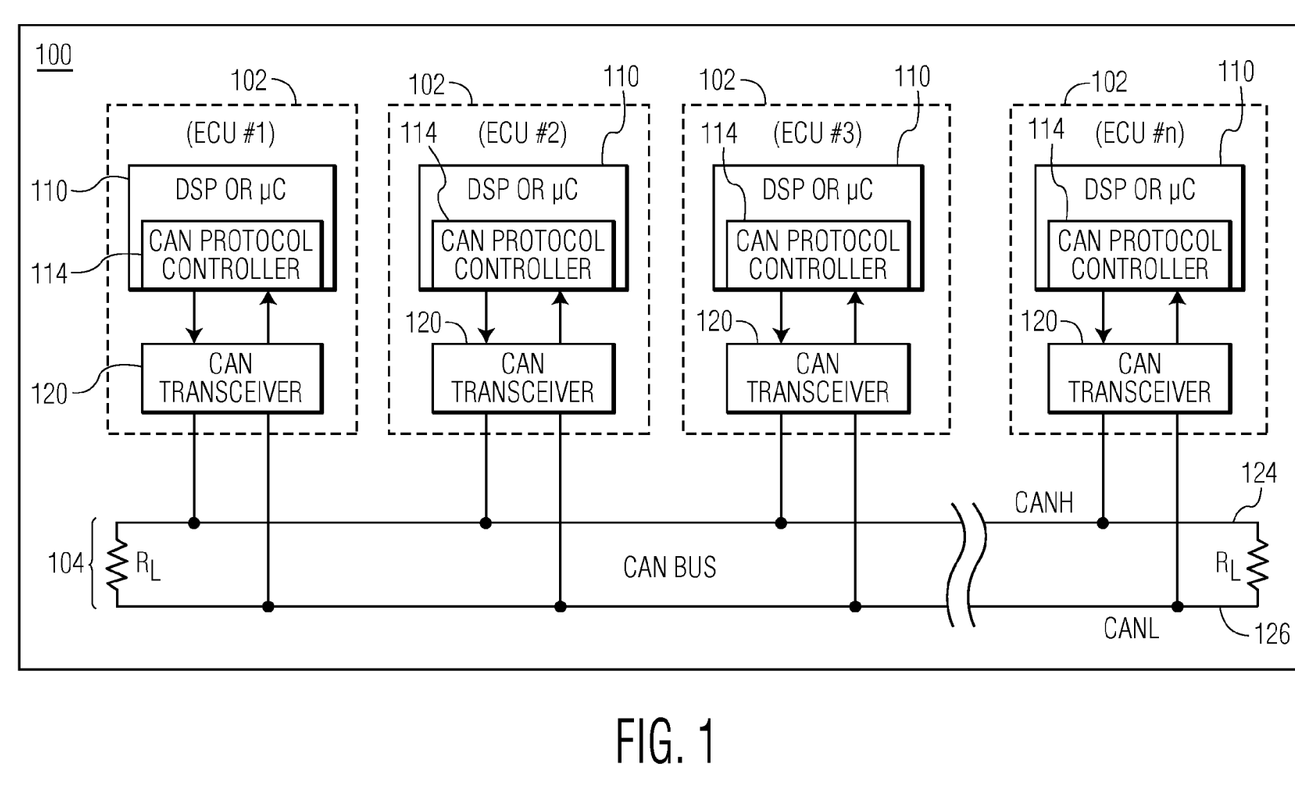
FIG. 1 depicts a CAN network that includes multiple electronic control units (ECUs), each connected to a CAN bus.

FIG. 1 depicts a CAN network 100 that includes multiple ECUs 102, also referred to as "nodes," each connected to a CAN bus 104. In the embodiment of FIG. 1, each ECU includes a microcontroller 110 having an embedded CAN protocol controller 114 and a CAN transceiver 120. The microcontrollers are typically connected to at least one device such as a sensor, an actuator, or some other control device and are programmed to determine the meaning of received messages and to generate appropriate outgoing messages. The microcontrollers, also referred to as host processors or digital signal processors (DSPs), are known in the field.

The CAN protocol controllers 114, which can be embedded within the microcontrollers 110 or external to the microcontrollers, implement data link layer operations as is known in the field. For example, in receive operations, a CAN protocol controller stores received serial bits from the transceiver until an entire message is available for fetching by the microcontroller. The CAN protocol controller can also decode the CAN frames according to the standardized frame format. In transmit operations, the CAN protocol controller receives transmit messages from the microcontroller and transmits bits serially in CAN frame format to the CAN transceiver.

The CAN transceivers 120 are located between the microcontrollers 110 and the CAN bus 104 and implement physical layer operations. For example, in receive operations, a CAN transceiver converts analog differential signals from the CAN bus to serial digital signals that the CAN protocol controller can interpret. The CAN transceiver also protects the CAN protocol controller from extreme electrical conditions on the CAN bus, e.g., electrical surges. In transmit operations, the CAN transceiver converts serial digital bits received from the CAN protocol controller into analog differential signals that are sent on the CAN bus.

The CAN bus 104 carries analog differential signals and includes a CAN high (CANH) bus line 124 and a CAN low (CANL) bus line 126. The CAN bus is known in the field.

Figure 2:
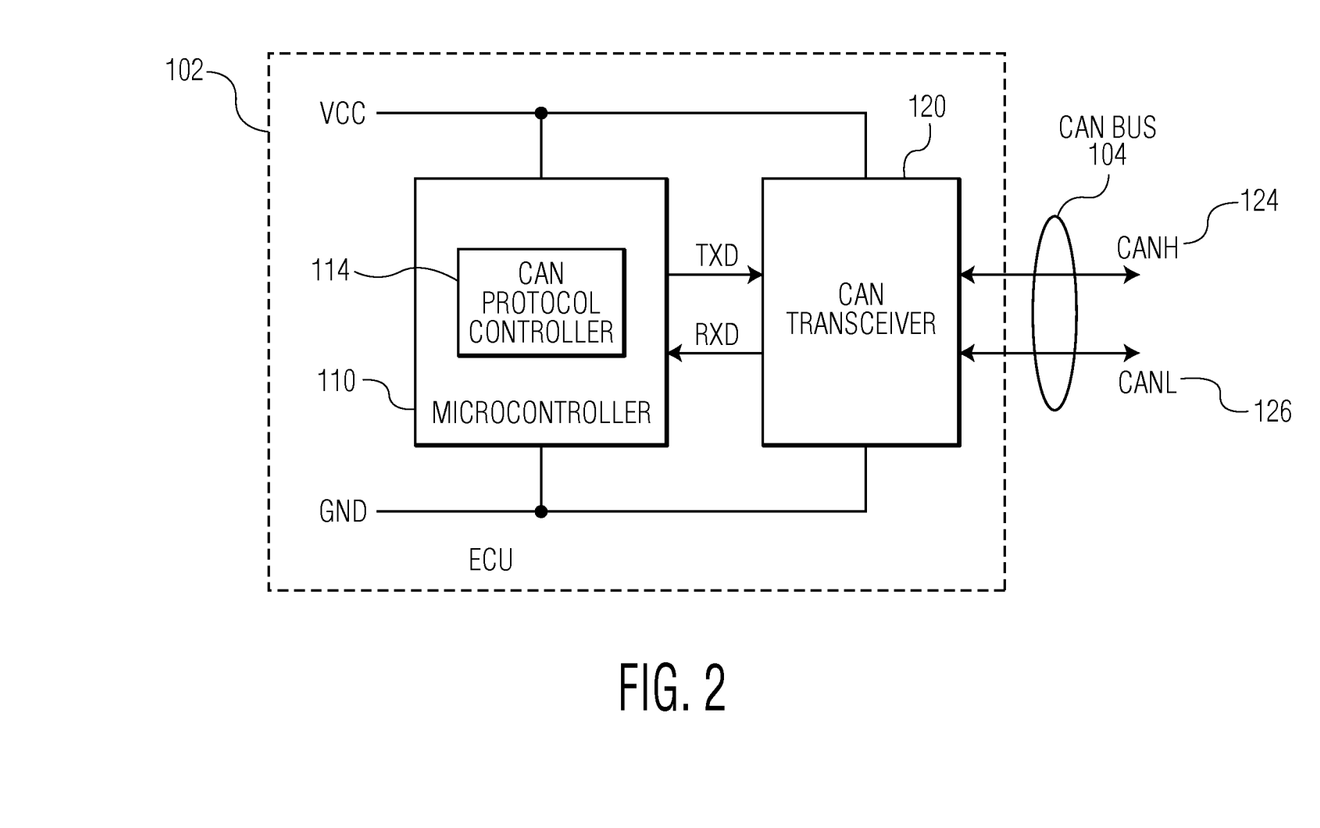
FIG. 2 depicts an expanded view of one ECU from FIG. 1.

FIG. 2 depicts an expanded view of one ECU 102 from FIG. 1. The microcontroller 110 and the CAN transceiver 120 of the ECU are connected between a supply voltage, $V_{CC}$, and ground, GND. As illustrated in FIG. 2, data communicated from the microcontroller to the CAN transceiver is identified as transmit data (TXD) and data communicated from the CAN transceiver to the microcontroller is referred to as receive data (RXD). Data is communicated to and from the CAN bus via the CANH and CANL bus lines 124 and 126, respectively.

As noted above, the CAN protocol controller can be configured to support the normal mode or the flexible data rate mode. As used herein, "CAN normal mode" refers to frames that are formatted according to the ISO 11898-1 standard and "CAN FD mode" refers to frames that are formatted according to the emerging ISO 11898-1 WD standard, or an equivalent thereof. The emerging ISO 11898-1 WD standard is described in the document, *CAN with Flexible Data-Rate*, Specification Version 1.0, released Apr. 17, 2012, which is incorporated by reference herein.

Figure 3A:
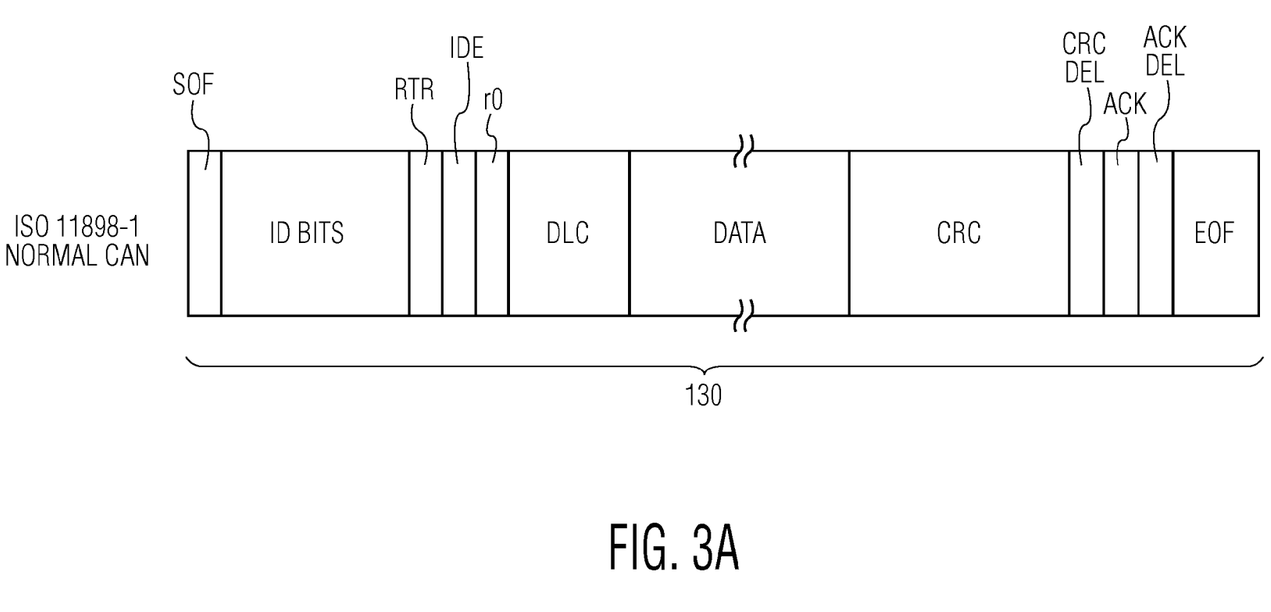
FIG. 3A depicts the format of an ISO 11898-1 frame that is used in CAN normal mode.
Figure 3B:
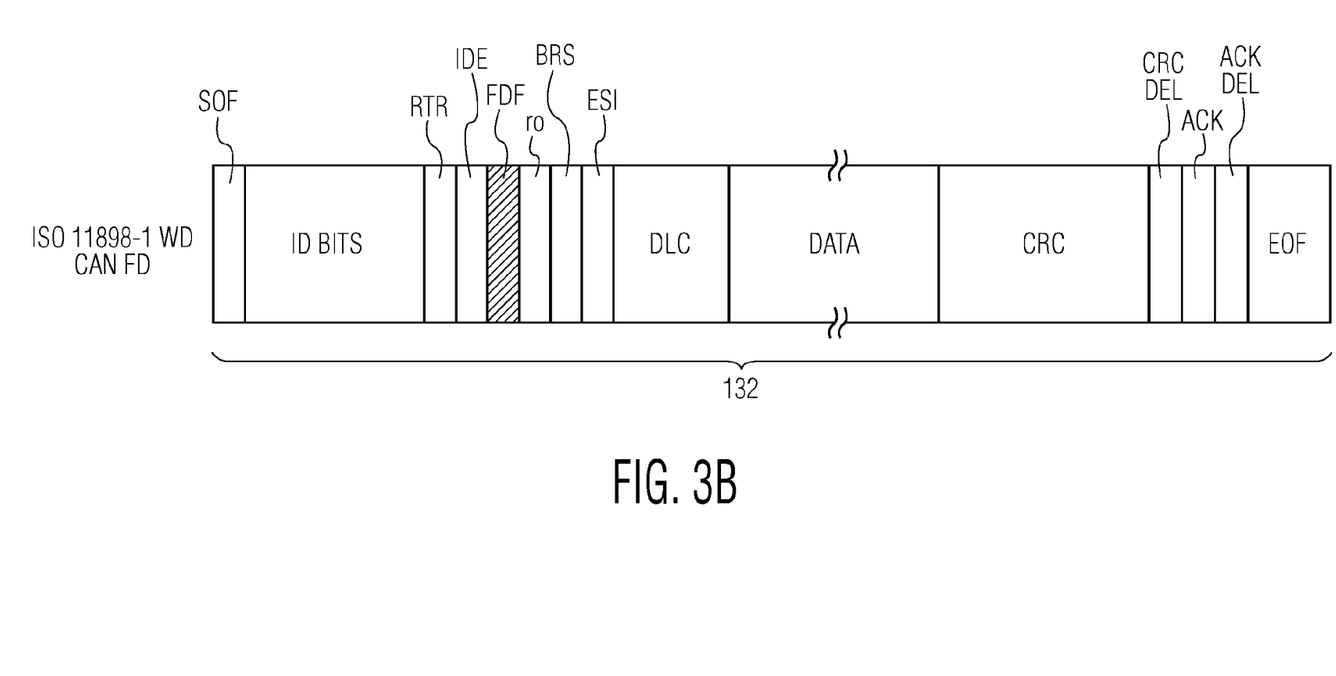
FIG. 3B depicts the format of an ISO 11898-1 WD frame that is used in CAN FD mode.

FIG. 3A depicts the format of an ISO 11898-1 frame 130 that is used in CAN normal mode and FIG. 3B depicts the format of an ISO 11898-1 WD WD frame 132 that is used in CAN FD mode. The fields of the CAN normal mode and CAN FD mode frames are defined as follows:

SOF Start of Frame (always dominant)
ID Bits Identifier Bits, defining the message content
RTR Remote transmission Request
IDE ID Extension
r0 Reserved Bit 0 (replaced by FDF in the CAN FD format)
FDF FD Format (this is the bit distinguishing the frame formats)
BRS Baud Rate Switch
ESI Error State Indicator
DLC Data Length Code
Data Data Bytes
CRC Cyclic Redundancy Check
CRC Del CRC Delimiter (always recessive)
ACK Acknowledge
ACK Del Acknowledge Delimiter
EOF End Of Frame Of note, the CAN protocols use the reserved bit (r0) within a CAN normal mode frame to identify a frame as a CAN FD mode frame. In particular, the reserved bit (r0) is a 1-bit field that indicates whether the frame is a CAN normal mode frame (ISO 11898-1) or a CAN FD mode frame (ISO 11898-1 WD). When the reserved bit (r0) is dominant (e.g., low), the frame is a CAN normal mode frame and when the reserved bit (r0) is recessive (e.g., high), the frame is a CAN FD mode frame. In a CAN normal mode frame, the reserved bit (r0) is always driven dominant to the bus lines and therefore a CAN normal mode frame always overrides a potential recessive FDF bit on the bus lines coming from a CAN protocol controller that implements CAN FD mode. Accordingly, a CAN normal mode frame always wins bus access within a bus arbitration phase.

As described above, in order for an ECU to support CAN FD mode, the CAN protocol controller must support CAN FD mode. If the CAN protocol controller does not support CAN FD mode but receives a CAN FD mode frame, then the CAN protocol controller will not recognize the frame and will likely enter an error state, which typically causes the CAN protocol controller to output an error signal on the CAN bus. However, it is desirable to have a node that only supports CAN normal mode coexist on the same CAN bus as nodes that support CAN FD mode. In accordance with an embodiment of the invention, a CAN transceiver of an ECU in a CAN is configured to detect the presence of CAN FD mode traffic and to implement a change in an operating state of the CAN transceiver, such as disconnecting the CAN protocol controller of the ECU from the CAN bus, if CAN FD mode traffic is detected. Implementing a change in an operating state of the CAN transceiver, such as disconnecting the CAN protocol controller from the CAN bus, when CAN FD mode traffic is detected, prevents the CAN protocol controller at the microcontroller from passing an error signal to the CAN bus in response to a CAN FD mode frame and therefore allows a normal mode CAN protocol controller to coexist on the same CAN bus with FD mode CAN protocol controllers.

In one embodiment, changing an operation state of the CAN transceiver involves disconnecting the transmit data (TXD) from the CAN bus to prevent the transmission of error signals onto the CAN bus and in another embodiment, changing an operation state of the CAN transceiver involves disconnecting the receive data (RXD) from the CAN protocol controller to prevent CAN FD mode frames from reaching the CAN protocol controller. When the end of the last FD mode frame is detected (e.g., as indicated by the EOF field), the CAN transceiver can reconnect the CAN protocol controller to the CAN bus.

In a further embodiment, when CAN FD mode frames are detected, the CAN transceiver generates one or more dummy frames that are compatible with the CAN normal mode and provides the dummy frames to the CAN protocol controller to keep the CAN protocol controller from entering an error state. Once the end of an FD mode frame is detected, the CAN transceiver can cease generation of the dummy frames.

Figure 4:
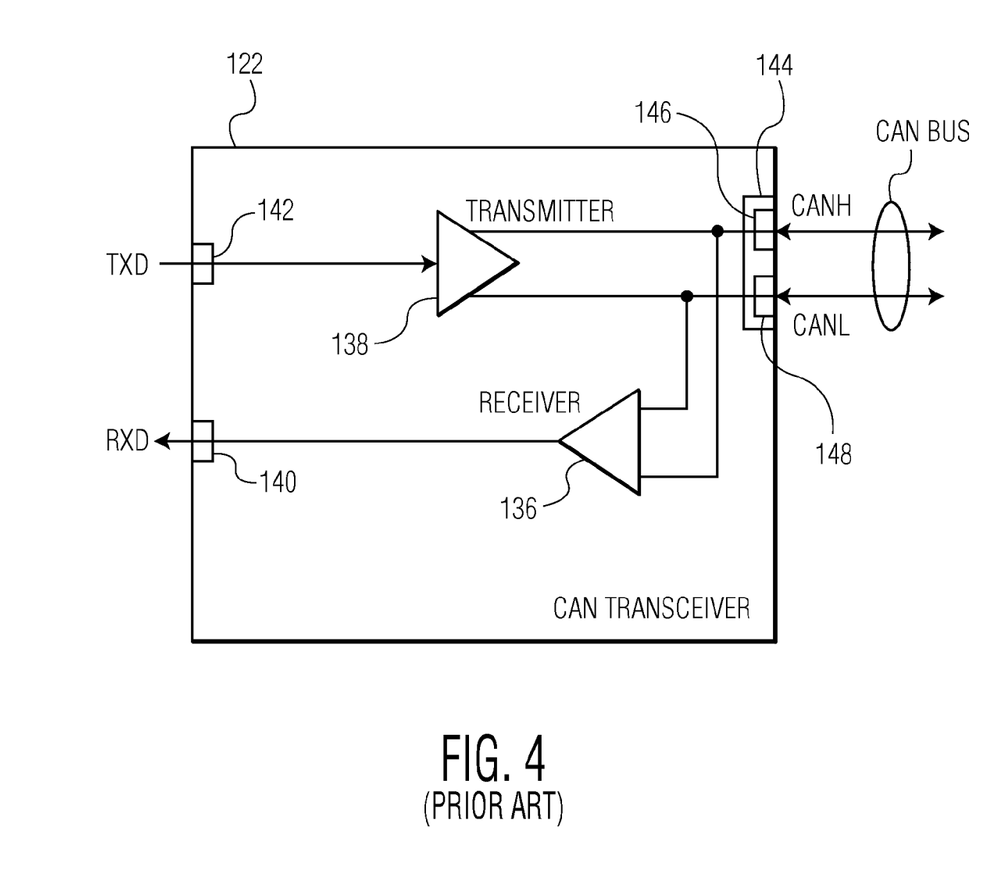
FIG. 4 depicts an embodiment of a conventional CAN transceiver that includes a receiver, a transceiver, a receive data (RXD) interface, a transmit data (TXD) interface, and a CAN bus interface.

A conventional CAN transceiver is not able to detect the type of frames that are being received on the CAN bus and therefore cannot selectively control its own operating state in response to the type of frames that are received. FIG. 4 depicts an embodiment of a conventional CAN transceiver 122 that includes a receiver 136, a transceiver 138, an RXD interface 140, a TXD interface 142, and a CAN bus interface 144 having a CANH bus interface 146 and a CANL bus interface 148. CAN traffic that is received at the CAN bus interface is simply passed to the RXD interface via the receiver and CAN traffic that is received at the TXD interface is simply transmitted out the CAN bus interface via the transmitter. Because the CAN transceiver has no ability to detect the type of frames being received, the CAN traffic is passed through the CAN transceiver without regard to whether the frames are CAN normal mode or CAN FD mode frames.

Figure 5A:
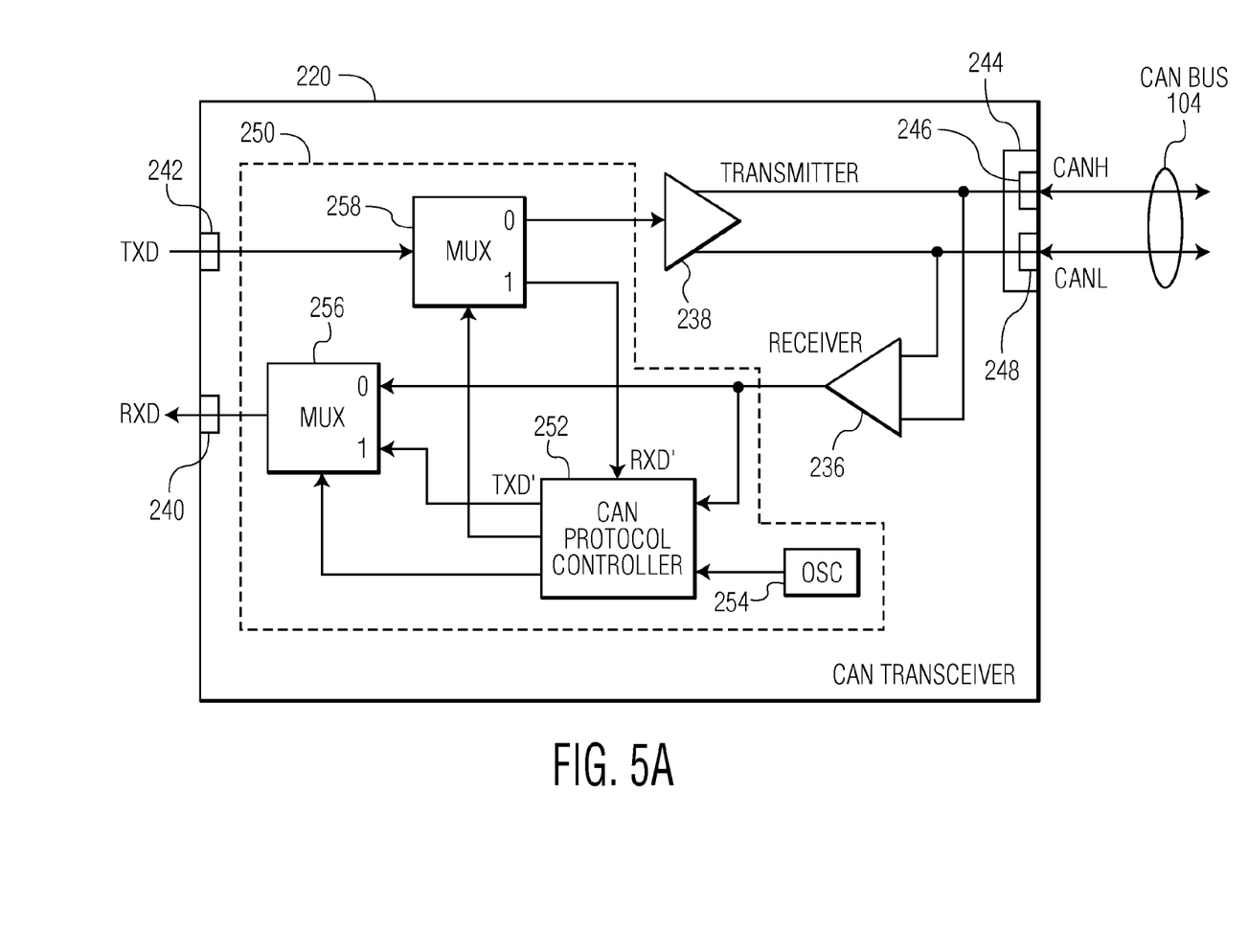
FIG. 5A depicts an embodiment of a CAN transceiver that is configured to detect the presence of CAN FD mode traffic and to implement a change in an operating state of the CAN transceiver, if CAN FD mode traffic is detected.

FIG. 5A depicts an embodiment of a CAN transceiver 220 that is configured to detect the presence of CAN FD mode traffic and to implement a change in an operating state of the CAN transceiver, such as disconnecting the CAN protocol controller 114 at the microcontroller 110 from the CAN bus 104, if CAN FD mode traffic is detected. The CAN transceiver includes an RXD interface 240, a TXD interface 242, a CAN bus interface 244 (having a CANH bus interface 246 and a CANL bus interface 248), a receiver 236, a transmitter 238, and a traffic control system 250 that includes its own CAN protocol controller 252 and a switching system that allows the TXD interface and the RXD interface to be independently disconnected from the CAN bus interface, thereby disconnecting the CAN protocol controller at the microcontroller from the CAN bus. In the embodiment of FIG. 5A, the traffic control system includes the CAN protocol controller 252, an oscillator 254, a receive path multiplexer 256, and a transmit path multiplexer 258. The CAN protocol controller is connected to receive serial digital data from the receiver, timing signals from the oscillator, and serial digital data from the TXD interface (identified as RXD'). The CAN protocol controller is connected to output serial digital data (identified as TXD') to the receive path multiplexer and to output multiplexer control signals (CAN_FD_Detected_TXD, CAN_Normal_Dectected_TXD, CAN_FD_Detected_RXD, and CAN_Normal_Dectected_RXD) to the receive path multiplexer and/or to the transmit path multiplexer. The receive path multiplexer is connected to receive serial digital data directly from the receiver and from the CAN protocol controller and to output serial digital data to the RXD interface from either the CAN protocol controller or directly from the receiver depending on the state of the RXD multiplexer control signal (e.g., CAN_FD_Detected_RXD or CAN_Normal_Dectected_RXD). The transmit path multiplexer is connected to receive serial digital data from the TXD interface and to output serial digital data to either the transmitter or to the CAN protocol controller depending on the state of the TXD multiplexer control signal (e.g., CAN_FD_Detected_TXD or CAN_Normal_Dectected_TXD).

Figure 5B:
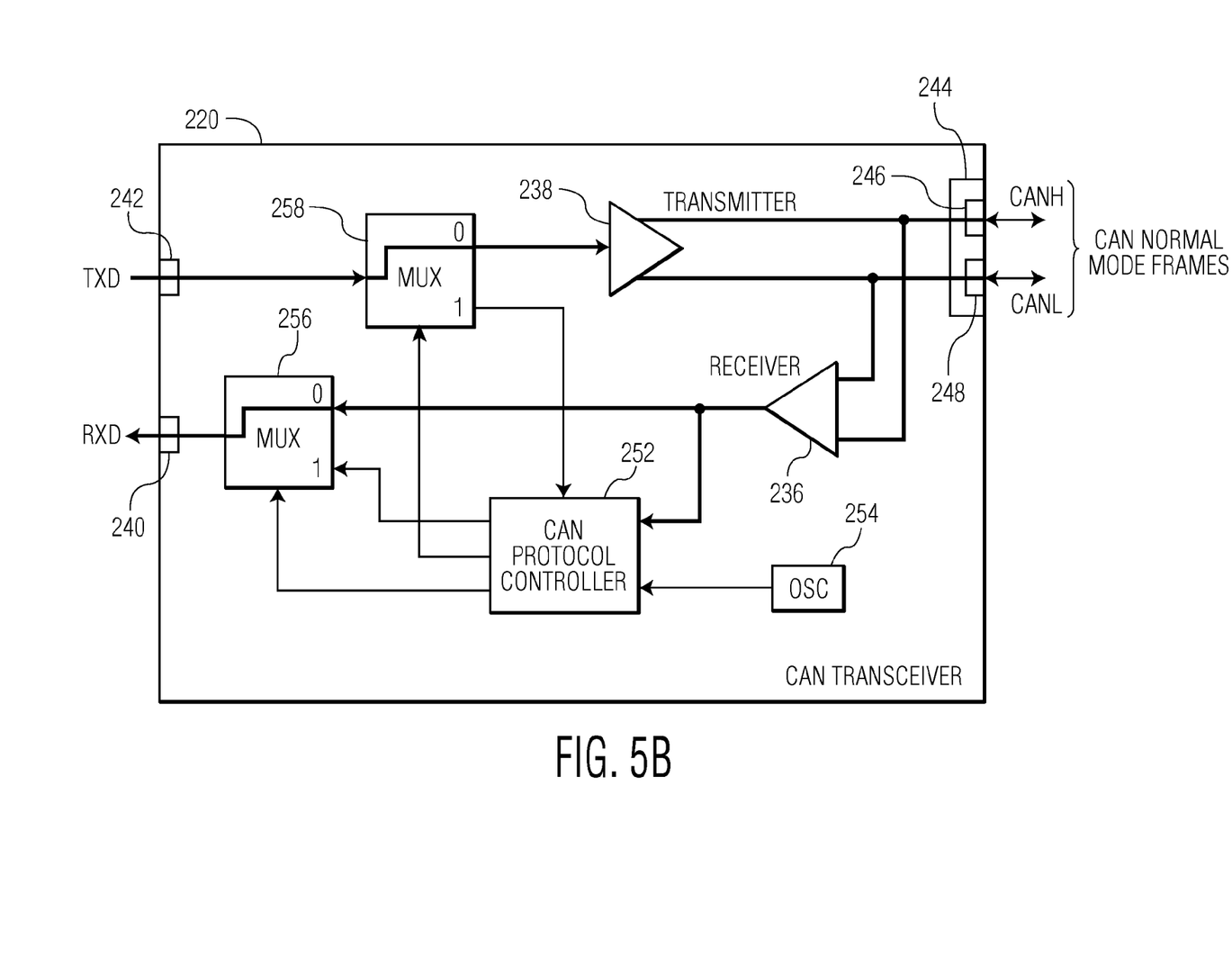
FIG. 5B illustrates an operational case of the CAN transceiver of FIG. 5A in which CAN normal mode traffic is received at the CAN bus.
Figure 5C:
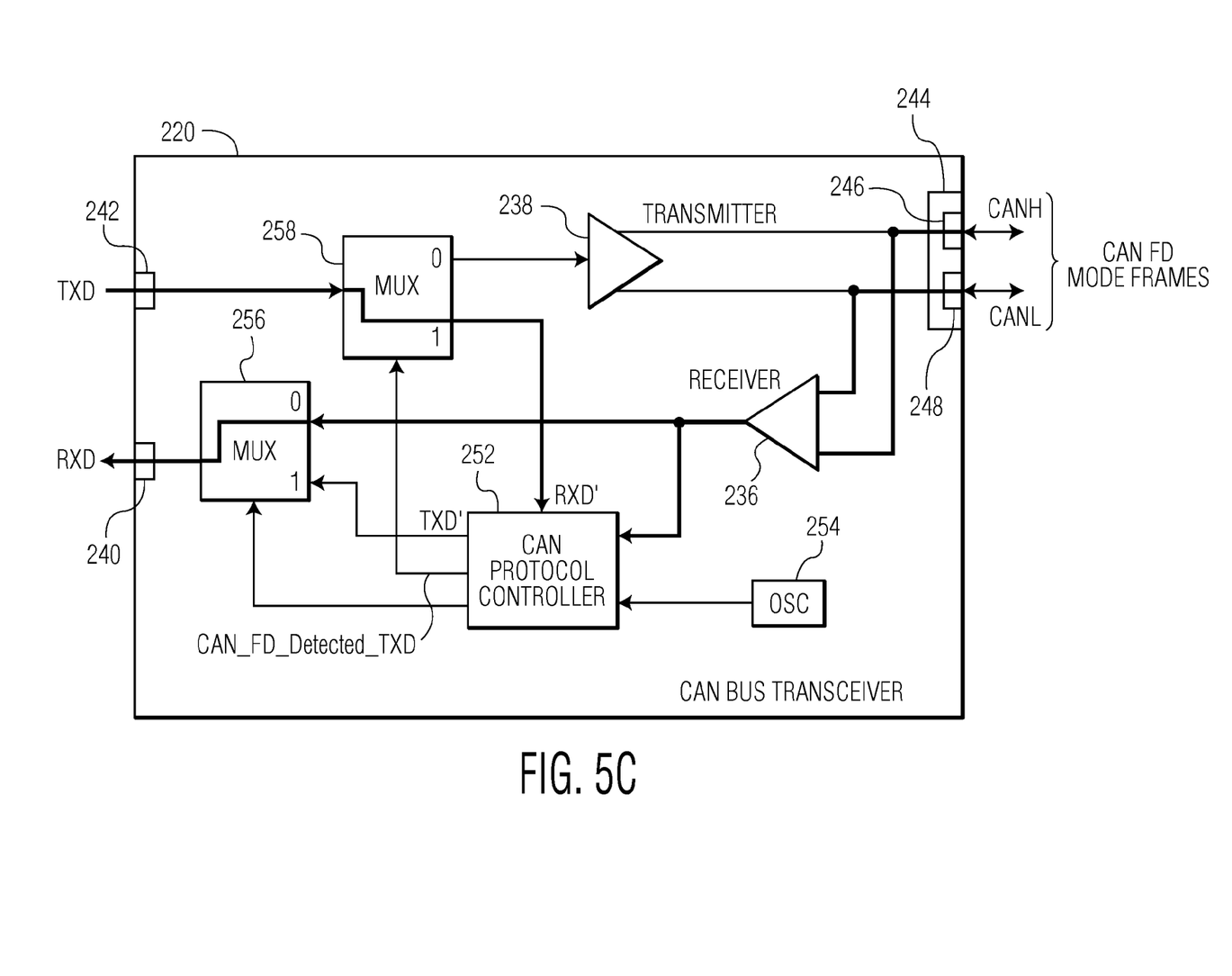
FIG. 5C illustrates an operational case of the CAN transceiver of FIG. 5A in which CAN FD mode traffic is received at the CAN bus and only the TXD interface is disconnected from the CAN bus.
Figure 5D:
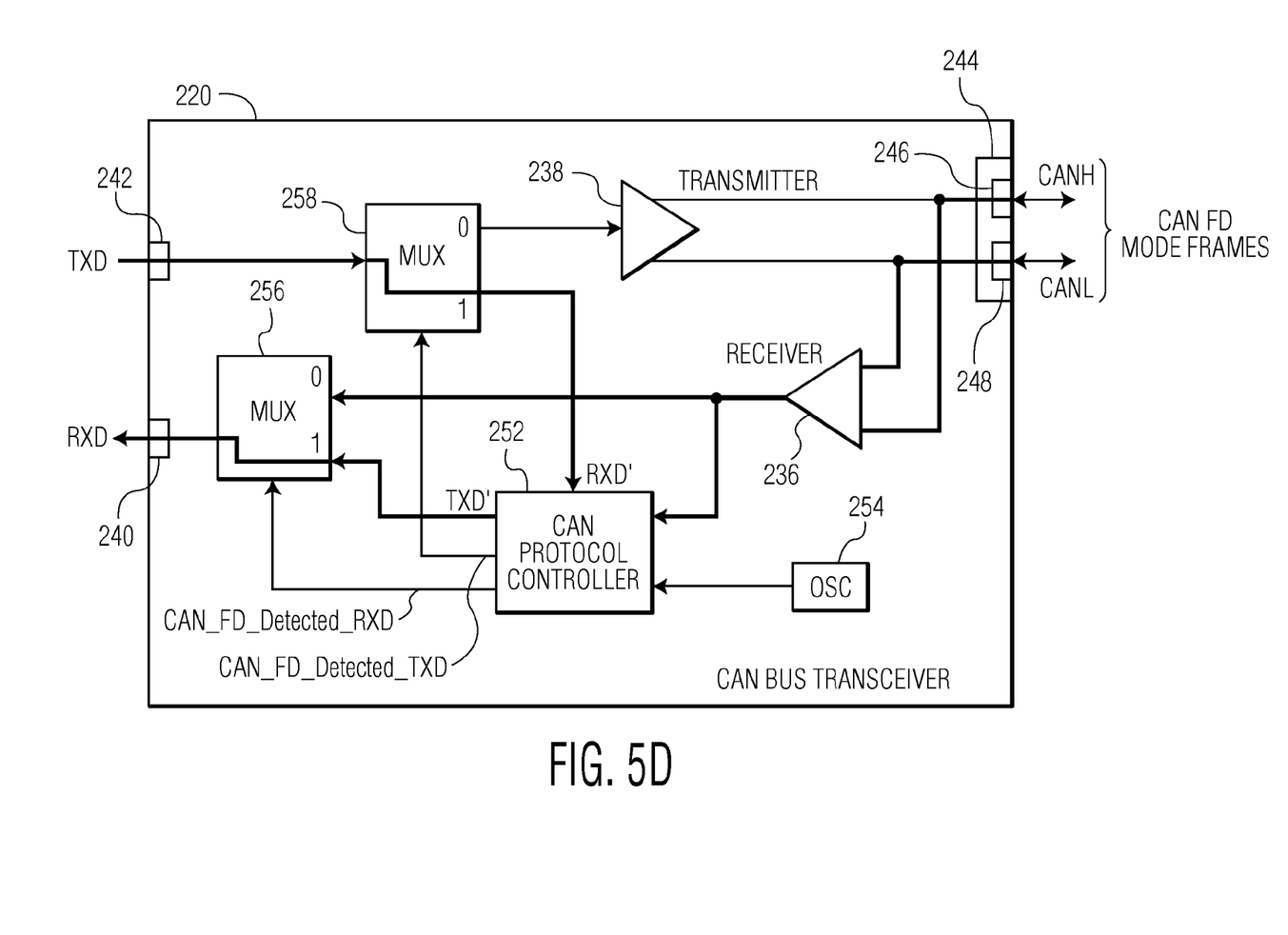
FIG. 5D illustrates an operational case of the CAN transceiver of FIG. 5A in which CAN FD mode traffic is received at the CAN bus and both the TXD interface and the RXD interface are disconnected from the CAN bus.

Operation of the transceiver of FIG. 5A is now described with reference to FIGS. 5B-5D. FIG. 5B illustrates the case in which CAN normal mode frames are received at the CAN bus and FIGS. 5C and 5D illustrate cases in which CAN FD mode frames are received at the CAN bus. In FIGS. 5B-5D, the dark lines indicate active data paths, e.g., channels on which data is being communicated. In the operational examples of FIGS. 5B-5D, it is presumed that the CAN transceiver 220 is connected to a microcontroller 110 that has a CAN protocol controller 114 that is only able to support CAN normal mode. That is, the microcontroller that is connected to the CAN transceiver expects to see only CAN normal mode traffic and is not even able to identify CAN FD mode traffic.

With reference to FIG. 5B, at least one CAN normal mode frame is transmitted on the CAN bus 104. The CAN normal mode frame is received by the receiver 236 and converted from differential signals to corresponding serial signals. The serial signals are provided to the CAN protocol controller 252 and to the RXD interface 240 via the receive path multiplexer 256. While the serial signals are provided to the RXD interface, the CAN protocol controller decodes the serial signals to determine if the received frame is a CAN normal mode frame or a CAN FD mode frame. In particular, the CAN protocol controller reads the reserved bit (r0) to determine the type of frame. In this embodiment, the CAN protocol controller of the CAN transceiver is able to distinguish between CAN normal mode frames and CAN FD mode frames as opposed to the CAN protocol controller of the microcontroller, which is not able to distinguish between CAN normal mode frames and CAN FD mode frames. Since the received frame is a normal mode frame, the transmit path multiplexer 258 is controlled to pass serial digital signals from the TXD interface directly to the transmitter 238. The transmitter then converts the digital signals to analog differential signals that are transmitted on the CAN bus 104. Additionally, since the received frame is a normal mode frame, the receive path multiplexer is controlled to pass the serial signals directly from the receiver to the RXD interface via the receive path multiplexer, effectively bypassing the CAN protocol controller 252 from the perspective of the RXD interface 240. For example, the receiver converts the analog differential signals to serial single-line digital signals and transmits the digital signals to the corresponding microcontroller 110 via the RXD interface. In an embodiment, the CAN protocol controller outputs CAN_Normal_Detected_TXD and CAN_Normal_Detected_RXD signals to the receive path multiplexer and to the transmit path multiplexer, respectively, to control the multiplexers to enable data communications paths as illustrated in FIG. 5B. In the example of FIG. 5B, the CAN protocol controller at the microcontroller expects to see CAN normal mode frames and does indeed see such frames. Therefore, the CAN protocol controller at the microcontroller is able to correctly interpret the data frames.

With reference to FIG. 5C, at least one CAN FD mode frame is transmitted on the CAN bus 104. The CAN FD mode frame is received by the receiver 236 and converted from analog differential signals to corresponding serial digital signals. The serial digital signals are provided to the CAN protocol controller 252 and to the RXD interface 240 via the receive path multiplexer 256 and initially, the first few bits of data are passed directly from the receiver to the RXD via the receive path multiplexer (not shown in FIG. 5C). While the serial signals are provided to the RXD interface, the CAN protocol controller decodes the serial signals to determine if the received frame is a CAN normal mode frame or a CAN FD mode frame. In particular, the CAN protocol controller reads the reserved bit (r0) in an "on the fly" operation to determine the type of frame. As described above, the CAN protocol controller of the CAN transceiver 220 is able to distinguish between CAN normal mode frames and CAN FD mode frames and since the received frame is an FD mode frame, an operating state of the CAN transceiver is changed. For example, the CAN protocol controller immediately changes an operation state of the CAN transceiver to disconnect the CAN bus interface from the TXD interface to prevent the transmission of error signals onto the CAN bus. In an embodiment, the CAN protocol controller asserts the CAN_FD_Detected_TXD signal to cause the transmit path multiplexer to direct the transmit data TXD from the TXD interface to the CAN protocol controller instead of to the transmitter. In this case, the CAN FD mode frames are passed to the microcontroller 110 via the RXD interface. However, because the TXD interface is disconnected from the CAN bus 104, any error signals that may be generated by the microcontroller do not reach the CAN bus. When the last FD mode frame is reached, the CAN transceiver can reconnect the TXD and RXD interfaces of the transceiver to the CAN bus interface.

With reference to FIG. 5D, at least one CAN FD mode frame is transmitted on the CAN bus 104. The CAN FD mode frame is received by the receiver 236 and converted from analog differential signals to corresponding serial digital signals. The serial digital signals are provided to the CAN protocol controller 252 and to the RXD interface 240 via the receive path multiplexer 256 and initially, the first few bits of data are passed directly from the receiver to the RXD via the receive path multiplexer (not shown in FIG. 5D). While the serial signals are provided to the RXD interface, the CAN protocol controller decodes the serial signals to determine if the received frame is a CAN normal mode frame or a CAN FD mode frame. In particular, the CAN protocol controller reads the reserved bit (r0) in an "on the fly" operation to determine the type of frame. As described above, the CAN protocol controller of the CAN transceiver 220 is able to distinguish between CAN normal mode frames and CAN FD mode frames and since the received frame is an FD mode frame, an operating state of the CAN transceiver is changed. For example, the CAN protocol controller immediately changes an operation state of the CAN transceiver to disconnect the CAN bus interface from the TXD interface to prevent the transmission of error signals onto the CAN bus. In an embodiment, the CAN protocol controller asserts the CAN_FD_Detected_TXD signal to cause the transmit path multiplexer to direct the transmit data TXD from the TXD interface to the CAN protocol controller instead of to the transmitter. Additionally, immediately upon detecting that the received frame is a CAN FD mode frame, the CAN protocol controller changes an operation state of the CAN transceiver to disconnect the CAN bus interface from the RXD interface to prevent CAN FD mode frames from reaching the CAN protocol controller. For example, the CAN protocol controller asserts the CAN_FD_Detected_RXD signal to cause the receive path multiplexer to select data from the CAN protocol controller (TXD') for output to the RXD interface instead of data received directly from the CAN bus. Once the end of the last FD mode frame is reached, the CAN transceiver can reconnect the TXD and RXD interfaces of the transceiver to the CAN bus interface.

In a further embodiment, when CAN FD mode frames are detected by the CAN protocol controller, the CAN protocol controller generates dummy frames that are compatible with the CAN normal mode and provides the dummy frames to the RXD interface (and ultimately to the CAN protocol controller at the microcontroller) to keep the CAN protocol controller at the microcontroller from entering an error state. Once the end of an FD mode frame is reached, the CAN protocol controller can cease generation of the dummy frames.

In an embodiment, the CAN protocol controller 252 of the CAN transceiver 220 simultaneously outputs the CAN_FD_Detected_RXD signal to the receive path multiplexer 256 and the CAN_FD_Detected_TXD to the transmit path multiplexer 258 to control the multiplexers to enable the data communications paths as illustrated in FIG. 5D. In the example of FIG. 5D, the CAN protocol controller at the microcontroller expects to see a CAN normal mode frame and does indeed see such a frame even though the CAN bus is actually receiving a CAN FD frame. In effect, the CAN transceiver hides the CAN FD traffic from the CAN protocol controller at the microcontroller. Therefore, the CAN protocol controller at the microcontroller is able to correctly interpret the data frame and does not enter an error state.

In some cases, it is desirable to ensure that the microcontroller does not start transmitting a frame too early, e.g., while a received CAN FD frame is still running on the CAN bus. In an embodiment, the CAN protocol controller of the CAN transceiver is configured to generate "CAN Overload Frames" and to output the frames to the microcontroller via the RXD interface. These Overload Frames are defined within the ISO 11898-1 standard as a measure to block a node from transmitting without causing error conditions. With that in place the microcontroller might be "parked" until the bus is free again for bus transmissions.

Figure 6:
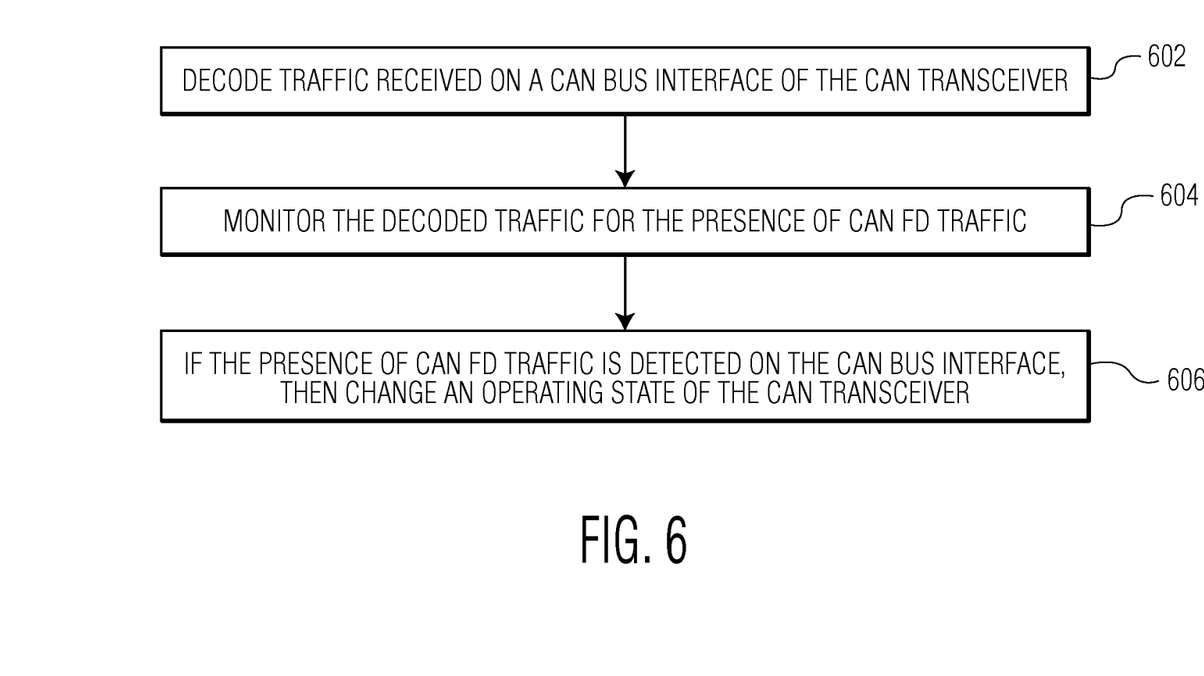
FIG. 6 is a process flow diagram of a method for operating a CAN transceiver in accordance with an embodiment of the invention.

FIG. 6 is a process flow diagram of a method for operating a CAN transceiver in accordance with an embodiment of the invention. At block 602, traffic received on a CAN bus interface of the CAN transceiver is decoded. At block 604, the decoded traffic is monitored for the presence of CAN FD traffic. At block 606, if the presence of CAN FD traffic is detected on the CAN bus interface, then an operating state of the CAN transceiver is changed.

In an embodiment, the above described operation states can be implemented individually or in combination. For example, in one embodiment, only the TXD interface is disconnected from the CAN bus and in another embodiment, both the TXD and RXD interfaces are disconnected from the CAN bus interface, and in anther embodiment, both the TXD and RXD interfaces are disconnected from the CAN bus interface and dummy frames are generated by the CAN protocol controller. Additionally, although some changes in operating state are described, other changes in operating state, which are made in response to detecting a CAN FD mode frame, can be made.

The above-described techniques enable microcontrollers that use the CAN normal mode to coexist with microcontrollers that use the CAN FD mode in a way that all ECUs are fully functional during normal operation of the CAN, e.g., during normal operation of an automobile. Additionally, the above-described techniques can be installed in to CANs of, for example, automobiles by simply equipping the normal mode ECUs with CAN transceivers as described above with reference to FIGS. 5A-6. No software updates to the microcontrollers or replacement microcontrollers are needed to enable the different microcontrollers (using different CAN modes) to coexist on the same CAN bus.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A Controller Area Network (CAN) transceiver comprising:
a CAN bus interface;
a TXD interface;
an RXD interface;
a transmitter connected between the TXD interface and the CAN bus interface;
a receiver connected between the RXD interface and the CAN bus interface;
a traffic control system connected between the CAN bus interface, the TXD interface, and the RXD interface to:
detect the presence of CAN Flexible Data-rate (FD) traffic on the CAN bus interface; and
if the traffic control system detects the presence of CAN FD traffic on the CAN bus interface, change an operating state of the transceiver, where the change in operating state includes disconnecting the CAN bus interface from one of the TXD interface or RXD interface and outputting a controlling message through the RXD interface to block data from being transmitted onto the TXD interface without causing an error condition.

2. The CAN transceiver of claim 1, wherein the change of operating state comprises outputting a dummy frame through the RXD interface.

3. The CAN transceiver of claim 2, wherein the dummy frame has an ISO 11898-1 compatible bit pattern.

4. The CAN transceiver of claim 1, wherein the traffic control system comprises a CAN protocol controller configured to decode traffic received on the CAN bus interface.

5. The CAN transceiver of claim 1, wherein the traffic control system further comprises a transmit path multiplexer configured to direct traffic from the TXD interface to a CAN protocol controller or to the transmitter depending on whether or not CAN FD traffic is detected on the CAN bus interface.

6. The CAN transceiver of claim 1, wherein the traffic control system further comprises a transmit path multiplexer and a receive path multiplexer configured to direct traffic to a CAN protocol controller or bypass the CAN protocol controller depending on whether or not CAN FD traffic is detected on the CAN bus interface.

7. A method for operating a Controller Area Network (CAN) transceiver, the method comprising:
decoding traffic received on a CAN bus interface of the CAN transceiver;
monitoring the decoded traffic for the presence of CAN Flexible Data-rate (FD) traffic; and
if the presence of CAN FD traffic is detected on the CAN bus interface, then changing an operating state of the CAN transceiver wherein the changing includes disconnecting the CAN bus interface from one of a TXD interface of the CAN transceiver or an RXD interface of the CAN transceiver and outputting a controlling message through the RXD interface to block data from being transmitted onto the TXD interface without causing an error condition.

8. The method of claim 7, wherein changing an operating state of the CAN transceiver comprises outputting a dummy frame through the RXD interface.

9. The method of claim 8, wherein the dummy frame has an ISO 11898-1 compatible bit pattern.

10. A Controller Area Network (CAN) transceiver comprising:
a CAN bus interface;
a TXD interface connected to the CAN bus interface;
an RXD interface connected to the CAN bus interface;
a transmitter connected between the TXD interface and the CAN bus interface;
a receiver connected between the RXD interface and the CAN bus interface; and
a CAN protocol controller configured to decode traffic received on the CAN bus interface and if the CAN protocol controller detects the presence of CAN Flexible Data-rate (FD) traffic on the CAN bus interface, to output a control signal to change an operating state of the CAN transceiver, wherein the change of operating state includes disconnecting the CAN bus interface from one of the TXD interface or the RXD interface and outputting a controlling message through the RXD interface to block data from being transmitted onto the TXD interface without causing an error condition.

11. The CAN transceiver of claim 10, wherein the change of state operating comprises outputting a dummy frame through the RXD interface.

12. The CAN transceiver of claim 11, wherein the dummy frame has an ISO 11898-1 compatible bit pattern.

13. The CAN transceiver of claim 10, further comprising a transmit path multiplexer connected between the TXD interface and the transmitter, the transmit path multiplexer being configured to output data to the CAN protocol controller while preventing the data from reaching the transmitter if the CAN protocol controller detects the presence of CAN FD traffic on the CAN bus interface and to output data to the transmitter if the CAN protocol controller does not detect the presence of CAN FD traffic on the CAN bus interface.

14. The CAN transceiver of claim 10, further comprising a receive path multiplexer connected between the RXD interface and the CAN protocol controller, the receive path multiplexer being configured to output a dummy frame from the CAN protocol controller while preventing data received by the receiver from reaching the RXD interface if the CAN protocol controller detects the presence of CAN FD traffic on the CAN bus interface and to output traffic directly from the receiver if the CAN protocol controller does not detect the presence of CAN FD traffic on the CAN bus interface.

* * * * *